July 21, 1959 A. PELAK 2,895,645
MIXING AND DISCHARGING APPARATUS
Filed June 11, 1956
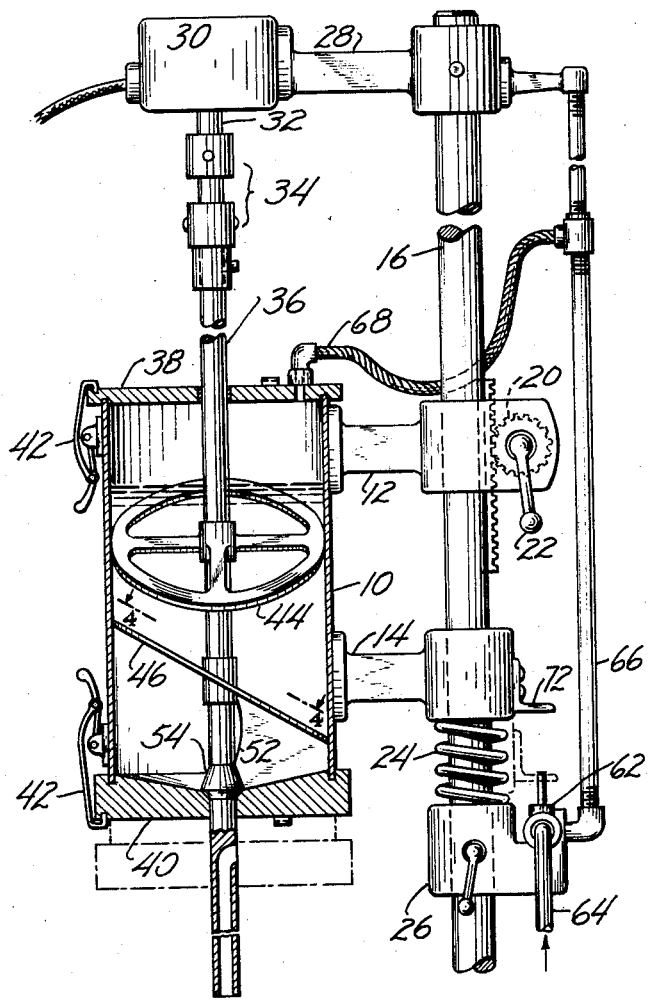
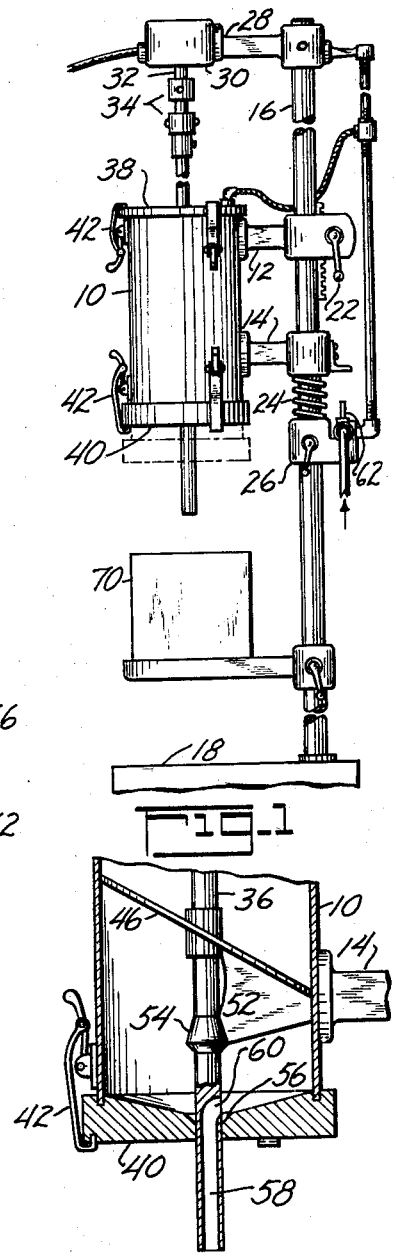
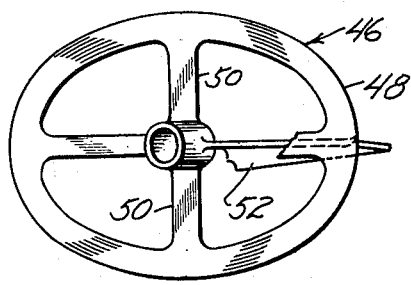
INVENTOR
ANDREW PELAK
BY *Godfrey B. Speir*
ATTORNEY United States Patent Office 2,895,645
Patented July 21, 1959

2,895,645

MIXING AND DISCHARGING APPARATUS

Andrew Pelak, Garfield, N.J., assignor to Curtiss-Wright Corporation, a corporation of Delaware Application June 11, 1956, Serial No. 590,556

7 Claims. (Cl. 222—162)

This invention relates to apparatus for mixing liquids, and for forcibly discharging the mixed liquids from the mixing container.

The invention is useful for mixing liquids of any sort, but it is particularly useful for mixing liquids which are discharged into a forming mold and which later harden into a plastic mass. Such latter liquids may comprise, for instance, a resin or prepolymer, a blowing agent, and a catalyst or reacting agent. These are blended or mixed in certain proportions and poured into a mold. After mixing and pouring, the liquid components react with one another, foam or blow to several times the liquid volume to form a cellular mass, and then cure to a hard, low-density end product. The three or more liquid components, each of which is stable by itself, must be mixed thoroughly in order to provide for uniform reaction and to attain an end product of uniform density and cellular structure. They must be mixed and poured rapidly while still in the liquid state, as the blowing or foaming reaction starts soon after initial mixing. The best product molding is secured when all, or nearly all, of the blowing or foaming occurs in the mold. This assures complete mold filling, wetting of the mold surfaces, and uniform product density.

In the manufacture of a particular aircraft component weighing finally about three pounds, prototypes were made by mixing the reactants manually for about 1½ minutes. Pouring into the mold took about 1½ minutes. Blowing took place while pouring, the blowing continuing after the completion of pouring for a short time. The blown mix in the mold then takes 15 to 20 minutes to set, and several hours to cure completely, after which it is removed from the mold.

By machine mixing and discharging, using the apparatus of this invention, the products were made more perfect and uniform, as the blending and mixing of the reactants was thoroughly attained in less than 1 minute, and discharging of the mix into the mold while still in the liquid state took but about 10 seconds. The blowing took place almost entirely in the mold during the succeeding 1½ to 2 minutes. Setting and curing time was the same as for the hand mix. Blowing of the mix almost entirely in the mold produced better surface engagement of the mixture with the mold, conserved material, and gave the final product uniform density throughout its bulk.

The apparatus of the invention is shown in detail in the annexed drawings in its present preferred embodiment. Therein, similar reference characters designate similar parts.

Fig. 1 is an over-all side elevation of a mixing machine according to the invention, Fig. 2 is an enlarged side elevation of part of the machine, partly in section, Fig. 3 is a section of part of the machine in the discharge position, and Fig. 4 is a view on the line 4—4 of Fig. 2 of one of the mixing paddles.

The machine comprises an open-end cylindrical container 10 carried on brackets 12 and 14 slidably mounted on a post 16. The post or standard 16 is secured to a base such as 18, or it may be securely mounted on a wall or the like, as may be desired. The bracket 12 is equipped with a pinion 20 and hand crank 22 to turn it, the pinion engaging a rack 24 secured on the post 16. Crank turning raises or lowers the container 10. A spring 24 may be provided between the lower bracket 14 and a member 26 which normally holds the container in a raised position, the spring being strong enough to support the container, its attachments, and the liquid load it is to contain.

The upper end of the post 16 carries a bracket 28 having a motor 30 thereon, the motor driving a downwardly directed shaft 32 which has a quick-disconnect, preferably universally jointed coupling 34 with a shaft 36. This shaft passes through a central hole in a container cover 38, through the container 10, and through a container bottom 40. The cover 38 and bottom 40 are preferably secured to the container by quick-detachable latches 42. Shaft 36 has permanently secured thereto one or more paddles or beaters, two such paddles being shown, the upper one at 44 and the lower one at 46. The paddles preferably comprise elliptical rims 48 having integral spokes 50 secured to a hub 52 which is attached to shaft 36 to rotate therewith. The rims 48 are designed to sweep a considerable area of the walls of the container and are in small clearance relation thereto throughout their peripheries. The uppermost part of the paddle 46 is slightly above the lowermost point on the paddle 44, so there is no unswept zone on the container wall between the paddles. The spokes 50 of the paddles, along with the rims 48, act as agitators, stirring liquid in the container up and down as well as rotationally during paddle rotation to assure thorough mixing. Spokes 50, along the minor axis of the paddle ellipse are pitched inherently to provide alternate upward and downward thrust on the liquid during paddle rotation. The other spokes may also be twisted to provide pitched blades. The rims themselves not only wipe close to the container walls, but also urge the liquid up and down in the container to expedite mixing. The lower part of paddle 46 is furnished with an auxiliary blade 52, secured between the paddle hub and rim, this blade being formed to wipe close to the lowermost part of the container wall, and close to the surface of the container bottom 40.

Shaft 36 is provided with a valve boss 54 near the container bottom, and a part of blade 52 lies close to the boss and may be secured to it.

The valve boss 54 is constructed to engage a valve seat 56 at times, as in Fig. 2. This seals the container bottom against liquid leakage when filling or mixing is in progress. Below the valve boss 54, shaft 36 is provided with a hollow end as at 58, the top of hollow 58 being ported at 60 to the surface of the shaft. When container 10 is lowered by turning crank 22, the shaft 36 stays in position so that the container bottom 40 drops below shaft port 60, and the container contents are discharged through the shaft hollow 58.

It should be noted that the shaft 36 is axially fixed and accordingly, the valve boss 54 thereon forms an upper limit stop for the container 10 as it is urged upwardly by spring 24 or other suitable raising means. The valve boss 54 engages the seat 56 under spring pressure, the firmly seated valve boss preventing any leakage of liquids in the container.

The bracket 26 secure on the post 16 carries an air valve 62, fed with compressed air from a supply line 64, and delivering valved air through a conduit 66 and flexible hose 68 to the top 38 of container 10. An actuator 72 on bracket 14 opens valve 62 for air delivery when the container 10 is lowered for discharge of mixed liquids. This action pressurizes the container, forcibly and quickly driving the mixed liquids therefrom through the shaft hollow 58; whence they enter any suitable mold or receptacle 70 disposed below the mixing apparatus.

In operating the machine, the container 10 is set in its upper position, the cover 38 is unlatched and raised and the mold 70 is put in place. The liquid components are poured into the container, the cover clamped down, and the motor 30 is started to mix the liquids.

After mixing for the desired time, crank 22 is turned to lower the container, and the mixed liquids are promptly discharged into the mold 70.

When used with hardenable plastic components, it is preferable to raise the container immediately after its contents have been discharged, and to introduce a batch of solvent into the container, stirring it by the paddles, and then discharging it as the plastic materials were discharged into another container. This procedure quickly cleans the machine and prevents hardening of residual resin in it.

It is deemed to be within the scope of the invention, although but a single embodiment has been shown or described, to modify the arrangements and components thereof, to the extent that such rearrangements and modifications may still be covered by the following claims. I aim, in these claims, to cover all novel features of the invention.

I claim:

1. A mixing machine for pourable liquids comprising a closed container, openable means at the upper part of the container for introducing liquids therein, a shaft extending through said container having paddles thereon for stirring and mixing the liquids upon rotation of said shaft, a selectively operable drain valve at the bottom of said container, and means to apply fluid pressure within said container to discharge liquids therein through said drain valve upon opening of the latter, said drain valve comprising a hollow lower end on said shaft having a port in the shaft surface communicating with the shaft hollow, and means to move said shaft and container axially to expose said port to the inside of said container, and to locate said port below the bottom of said container.

2. A mixing machine for pourable liquids comprising a closed container, openable means at the upper part of the container for introducing liquids therein, a shaft extending through said container having paddles thereon for stirring and mixing the liquids upon rotation of said shaft, a selectively operable drain valve at the bottom of said container, and means to apply fluid pressure within said container to discharge liquids therein through said drain valve upon opening of the latter, said drain valve comprising a hollow lower end on said shaft having a port in the shaft surface communicating with the shaft hollow, and means to move said shaft and container axially to expose said port to the inside of said container, and to locate said port below the bottom of said container, said paddles including elliptical rim portions sloped relative to the shaft axis, said rim portions sweeping close to all internal surfaces of said container which are engaged by said liquid.

3. A mixing machine for liquids comprising a cylindrical container open at its ends, a cover and a bottom for said container, quick detachable means for securing said cover and bottom to said container, said cover and bottom having central bearings, a shaft passing through said bearing and through said container, rotatable and axially movable relative thereto, paddles on said shaft having rims formed to sweep close to the wall of said container and to the upper face of said bottom, a port in the side of said shaft near said container bottom, said shaft being hollow from said port to the lower end thereof to provide at times an exit duct for said container, and means to move said container and shaft relatively to positions where said port lies within said container, and where the port lies outside of said container.

4. A mixing machine according to claim 3 including means to charge said container with pressure fluid in response to movement of said shaft port within said container.

5. A mixing machine according to claim 3 wherein means are provided to rotate said shaft and to hold it in relatively fixed axial position, and including means to support said container in coaxial relation to said shaft and to move said container axially relative to said shaft.

6. A mixing machine according to claim 3 wherein said paddles comprise perforate elliptical discs concentric with said shaft and having their planes skewed relative to the shaft axis.

7. A mixing machine according to claim 3 wherein said shaft is provided with a valve boss adapted to seat on said container bottom when said shaft port lies outside of said container.

References Cited in the file of this patent

UNITED STATES PATENTS

| | | |
|---|---|---|
| 286,384 | Caine | Oct. 9, 1883 |
| 456,161 | Rennerfelt | July 21, 1891 |
| 572,373 | Richards | Dec. 1, 1896 |
| 579,954 | Case | Apr. 6, 1897 |
| 1,654,429 | Peaden | Dec. 27, 1927 |
| 1,690,476 | Christiansen | Nov. 6, 1928 |
| 2,646,024 | Swallegan | July 21, 1953 |